United States Patent
Yanagihara et al.

(10) Patent No.: US 6,442,330 B2
(45) Date of Patent: *Aug. 27, 2002

(54) DIGITAL SIGNAL PROCESSOR, PROCESSING METHOD, DIGITAL SIGNAL RECORDING/PLAYBACK DEVICE AND DIGITAL SIGNAL PLAYBACK METHOD

(75) Inventors: Naofumi Yanagihara, Tokyo; Teruyoshi Komuro; Hisato Shima, both of Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/754,610

(22) Filed: Jan. 4, 2001

Related U.S. Application Data

(62) Division of application No. 09/049,446, filed on Mar. 27, 1998, now Pat. No. 6,253,019, which is a continuation of application No. 08/769,846, filed on Dec. 19, 1996, now Pat. No. 5,899,578.

(30) Foreign Application Priority Data

Dec. 25, 1995 (JP) ............................................. 7-350918
Dec. 28, 1995 (JP) ............................................. 7-352830
Dec. 28, 1995 (JP) ............................................. 7-352831

(51) Int. Cl.$^7$ .............................. H04N 7/06; H04N 7/04
(52) U.S. Cl. ............................................ 386/75; 386/98
(58) Field of Search .............................. 386/75, 83, 46, 386/54, 92, 95, 98, 39, 1, 4, 69, 68, 52; 725/86, 87, 101, 102; H04N 7/06, 7/04

(56) References Cited

U.S. PATENT DOCUMENTS

| | | | |
|---|---|---|---|
| 4,879,611 A | * 11/1989 | Fukui et al. .................... 386/83 |
| 5,182,771 A | 1/1993 | Munich et al. ................. 380/5 |
| 5,208,679 A | 5/1993 | Yamauchi et al. .......... 386/125 |
| 5,377,051 A | 12/1994 | Lane et al. ................. 380/33.1 |
| 5,532,833 A | 7/1996 | Hong et al. .................. 386/124 |
| 5,899,578 A | * 5/1999 | Yanagihara et al. ........... 386/75 |

* cited by examiner

Primary Examiner—Robert Chevalier
(74) Attorney, Agent, or Firm—Frommer Lawrence & Haug LLP; William S. Frommer; Gordon Kessler

(57) ABSTRACT

A MPEG video decoder and MPEG audio decoder respectively decode MPEG video data and MPEG audio data separated by a demultiplexer. A digital interface sends and receives MPEG video data, MPEG audio data and supplementary data between the demultiplexer and external devices. The digital interface detects a flag indicating a discontinuity in a program from an input signal, and a microcomputer performs control so as to initialize the buffer memories.

42 Claims, 12 Drawing Sheets b0 : DISCONTINUITY FLAG
b1 : SPEED CHANGE PLAYBACK FLAG

| FMT (BINARY) | CONTENTS |
|---|---|
| 000000 | DVCR |
| 000001 : | RESERVED |
| 100000 | MPEG |
| 111110 | FREE (VENDOR UNIQUE) |
| 111111 | NO DATA |

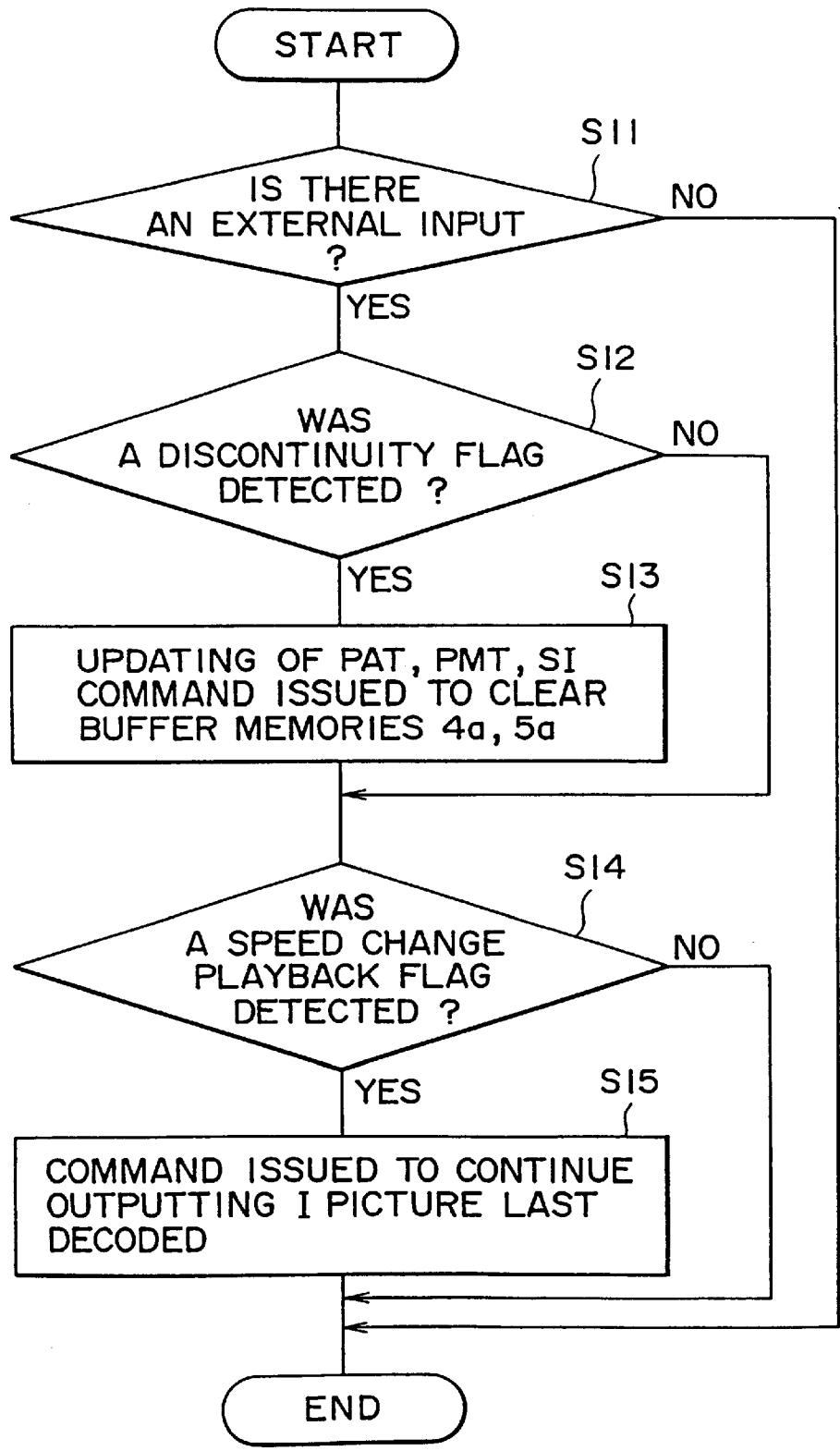

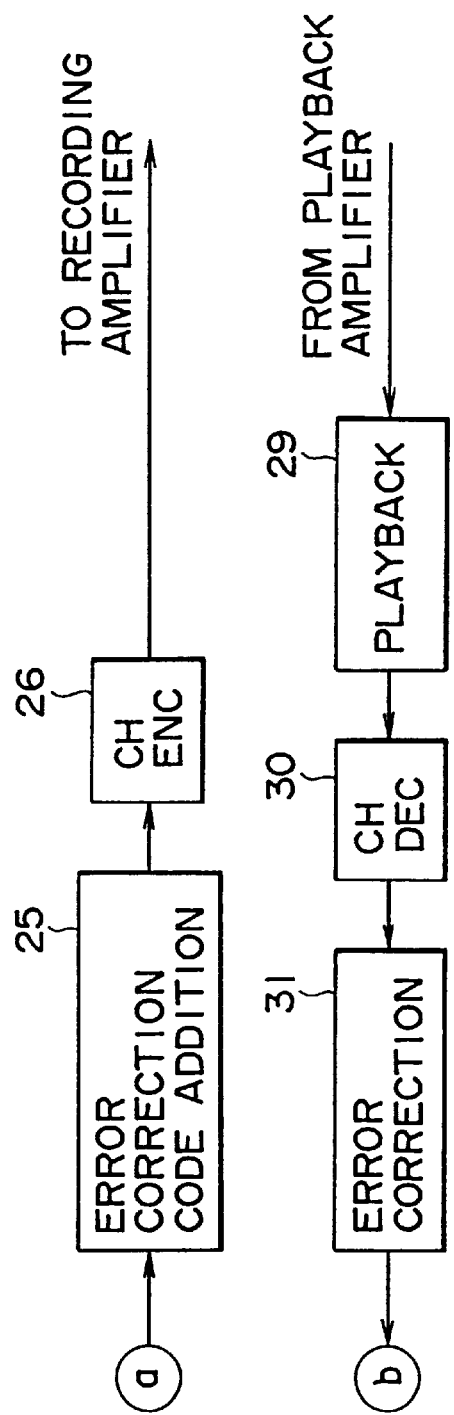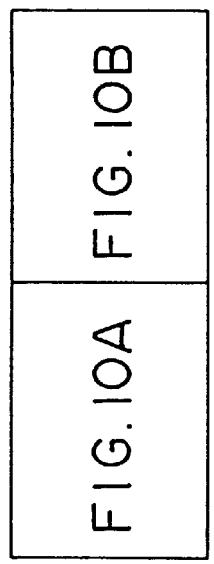

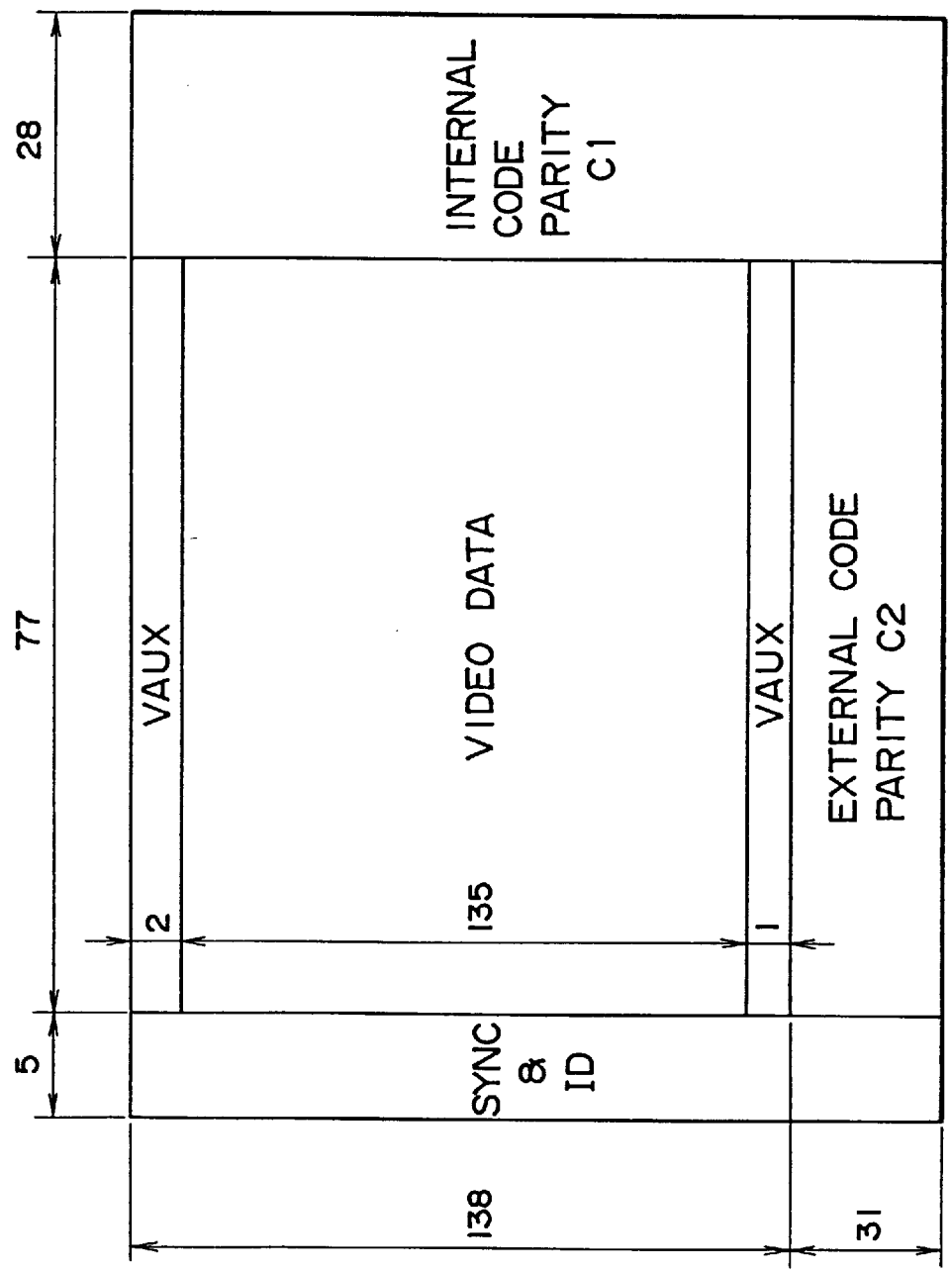

F I G. 12

| VCR MODE | OUTPUT DATA | DISCONTINUITY FLAG | SPEED CHANGE PLAYBACK FLAG |
|---|---|---|---|
| STOP → PB | (NONE) → NP | L → H (1sec) | — |
| PB | NP1 → NP2 | L → H (1sec) | — |
| PB → Slow | NP → NP(slow) | L | L → H |
| Slow | NP(slow) | L | H |
| Slow → PB | NP(slow) → NP | — | H → L |
| PB → CUE/REV | NP → TP | L → H (1sec) | L → H |
| CUE/REV | TP1 → TP2 | L → H (1sec) | H |
| CUE/REV | TP | L | H |
| CUE/REV → PB | TP → NP | L → H (1sec) | H → L |
| STOP → CUE/REV | (NONE) → TP | L → H (1sec) | L → H |

DIGITAL SIGNAL PROCESSOR, PROCESSING METHOD, DIGITAL SIGNAL RECORDING/PLAYBACK DEVICE AND DIGITAL SIGNAL PLAYBACK METHOD

This application is a division of application Ser. No. 09/049,446, filed Mar. 27, 1998, now U.S. Pat. No. 6,253,019, which is a continuation of application Ser. No. 08/769,846, filed Dec. 19, 1996, now U.S. Pat. No. 5,899,578.

BACKGROUND OF THE INVENTION

1. Field of the Invention

This invention relates to a device which receives and decodes digital broadcasts, and in particular, to processing performed when undecoded video data and audio data are input from an external recording/playback device.

It also relates to a device which records and plays back video signals and audio signals coded using a high performance technique such as that of MPEG (Moving Picture Image Coding Experts Group), and in particular, to a technique whereby identifying data is added showing a discontinuity or speed change playback mode of a playback program.

2. Description of Related Art

In recent years, in the U.S.A. and Europe, systems have become generalized where high performance coding techniques such as developed by MPEG (Moving Picture Image Coding Expert Group) are applied to the coding of video signals and audio signals, which are then transmitted via a communications satellite and decoded on the receiving side.

In these systems, a special receiver/demodulator is required on the receiving side. This receiver comprises a part which selects a transport stream corresponding to a desired channel from a transport stream in which the data from a plurality of channels is multiplexed, a part which separates desired program video and audio data from the desired channel transport stream, and a part which decodes the separated video and audio data.

In these systems, to make it possible for the receiver/decoder to receive the desired channel transport stream and separate the desired program video and audio data, PSI (Program Specific Information), EPG (Electronic Program Guide) or SI (Service Information) is added to the multiplexed transport stream.

Video tape recorders (referred to hereafter as DVCR) which encode video and audio signals before recording or playing them back, have been proposed. The concept has also been proposed of recording/playing back this digital broadcast video data and audio data on such a DVCR without decoding them ("Digital Video Reader, illust.", pp. 140–152, Ohm Co., Aug. 25, 1995, ed. by Yukio Kubota).

SUMMARY OF THE INVENTION

This invention aims to make it possible to perform rapid decoding of video data and audio data in a receiver/demodulator if there is a program change when a DVCR of the aforesaid type continuously plays back a plurality of digital broadcast programs, and this data is then input to such a receiver/demodulator.

This invention further aims to provide a digital signal recording/playback device and digital signal playback method wherein there is no break in video data and audio data when the output during speed change playback of such a DVCR is input to a receiver/demodulator and decoded.

To resolve the above problems, the digital signal processor according to this invention is characterized in comprising first means for selecting a transport stream corresponding to any channel from a transport stream containing a plurality of multiplexed channels, second means for separating video data and audio data in any desired program from this transport stream by referring to supplementary data in the selected transport stream, third means for decoding the separated video and audio data, fourth means for sending video data, audio data and supplementary data from external devices to the second means, and detecting data indicating a program discontinuity, and fifth means for initializing the third means when the fourth means detects data indicating a program discontinuity.

Further, the digital signal processing method according to this invention is characterized in that, in a digital signal processor comprising first means for selecting a transport stream corresponding to any channel from a transport stream containing a plurality of multiplexed channels, second means for separating video data and audio data in any desired program from the transport stream by referring to supplementary data in the selected transport stream, third means for decoding the separated video and audio data, and fourth means for sending video data, audio data and supplementary data from external devices to the second means, and detecting data indicating a program discontinuity, the third means is initialized when the fourth means detects data indicating a program discontinuity.

According to this invention, the third means is initialized when the fourth means detects data indicating a program discontinuity.

Further, the digital signal recording/playback device according to this invention comprises first means for inputting/outputting a digital signal coded by a predetermined coding scheme, second means for recording said digital signal transmitted by said first means in a recording medium, third means for reproducing said digital signal recorded on said recording medium, and fourth means for detecting a program change in said digital signal played back by said third means, and is characterized in that said fourth means adds a first identifying data to the digital signal output by said first means when a program change is detected.

Further, the digital signal playback method according to this invention is characterized in that a first identifying data is added to this digital signal when a program in a playback digital signal changes, when a digital signal coded by a predetermined coding scheme is played back from a recording medium and output to an external device.

In the digital signal recording/playback device and digital signal playback method according to this invention, a second identifying signal may further be added during speed change playback.

According to this invention, a fourth means adds the first identifying data to the digital signal output by the first means when a program change in a digital signal played back by a third means is detected.

According to this invention, as described in detail hereinabove, decoding of video data and audio data can be performed rapidly when a program input from an external device is changed.

Also, as described hereinabove, decoding can be rapidly performed when there is a program change when playback data is input to and decoded by the receiver/demodulator according to this invention. Further, when the output from speed change playback is input to the receiver/demodulator, breaks in the decoded video data and audio data output can be avoided.

BRIEF DESCRIPTION OF THE DRAWINGS

FIG. 9 is a flowchart showing the processing performed by a microcomputer when there is an external input.

FIG. 10 and FIG. 10A, and FIG. 10B are block diagram showing the construction of a DVCR to which this invention is applied.

FIG. 11 is a diagram showing one track of data output by the error correction code adding circuit of FIG. 10.

FIG. 12 is a diagram showing flags in a DVCR to which this invention is applied.

DETAILED DESCRIPTION OF THE PREFERRED EMBODIMENTS

This invention will now be described in more detail with reference to the drawings.

Figure 1:
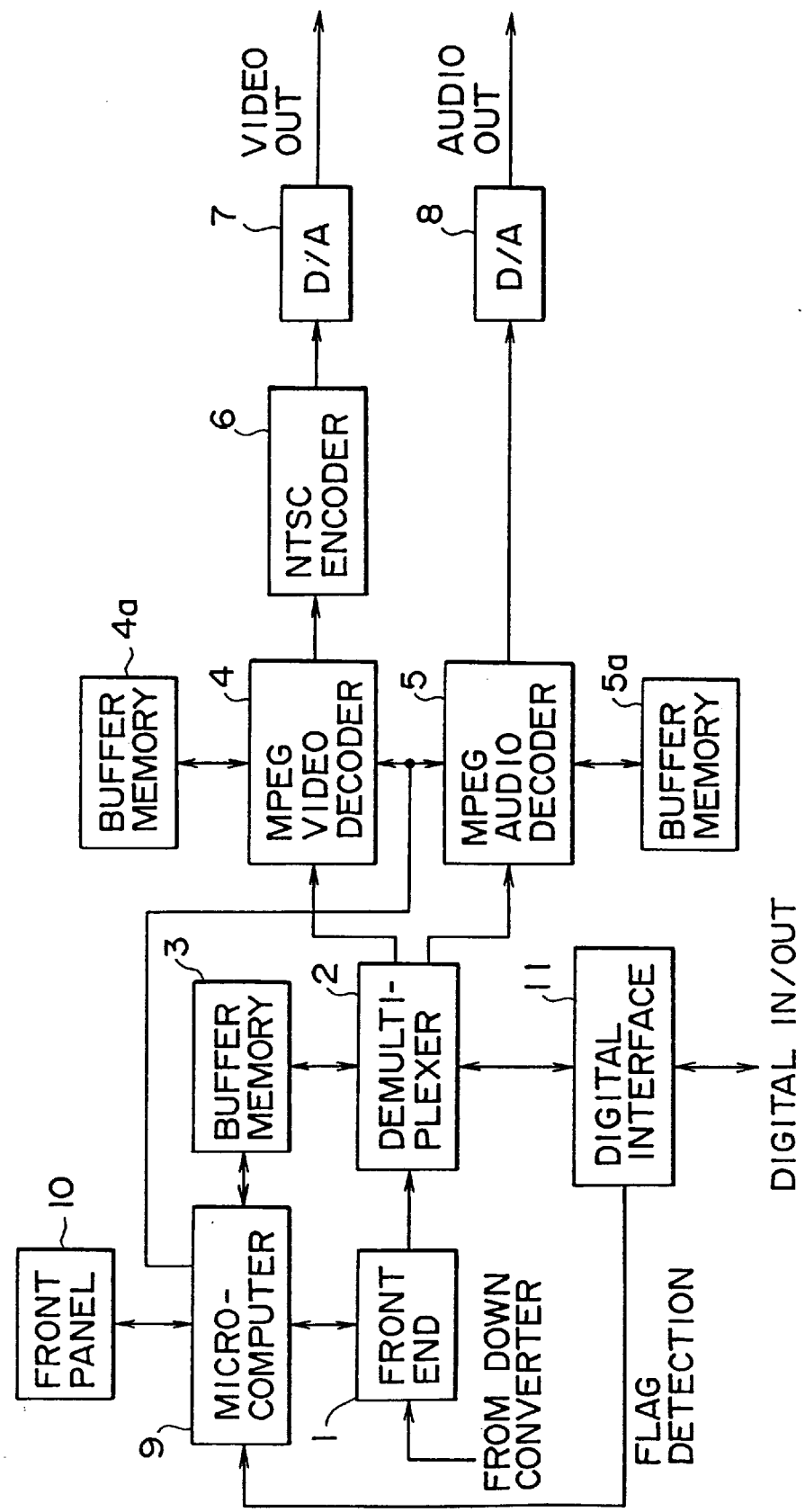
FIG. 1 is a block diagram showing the construction of a digital signal processor to which this invention is applied.

FIG. 1 is a block diagram showing the construction of a digital signal processor to which this invention is applied. This digital signal processor is referred to a IRD (Integrated Receiver Decoder).

This digital signal processor comprises a front end 1 which inputs an RF signal sent from a down converter, not shown, and selects a transport stream corresponding to a desired channel, a demultiplexer 2 which separates desired program MPEG video data, MPEG audio data and supplementary data selected by the front end 1, and a buffer memory 3 which temporarily stores data input and output through the demultiplexer 2.

This digital signal processor further comprises an MPEG video decoder 4 which decodes video data separated by the demultiplexer 2, an MPEG audio decoder 5 which decodes audio data separated by the demultiplexer 2, an NTSC encoder 6 which converts video signals decoded by the MPEG video decoder 4 into video signals in the NTSC format, a D/A converter 7 which converts the output of the NTSC encoder 6 into an analog format, and a D/A converter 8 which converts the output of the MPEG audio decoder 5 into an analog format. The MPEG video decoder 4 is provided with a buffer memory 4a which temporarily stores video data, and the MPEG audio decoder 5 is provided with a buffer memory 5a which temporarily stores audio data.

This digital signal processor further comprises a microcomputer 9 which controls the overall operation of the processor, a control panel 10, and a digital interface 11 which transmits MPEG video data, MPEG audio data and supplementary data separated by the demultiplexer 2 to external devices, or transmits MPEG video data, MPEG audio data and supplementary data received from external devices to the demultiplexer 2.

The front end 1 comprises a tuner, QPSK demodulator and error correction circuit, selects a desired channel transport stream specified by a user from the control panel 10 from a transport stream containing a plurality of multiplexed channels, performs QPSK demodulation, and performs error detection/correction.

Figure 2:
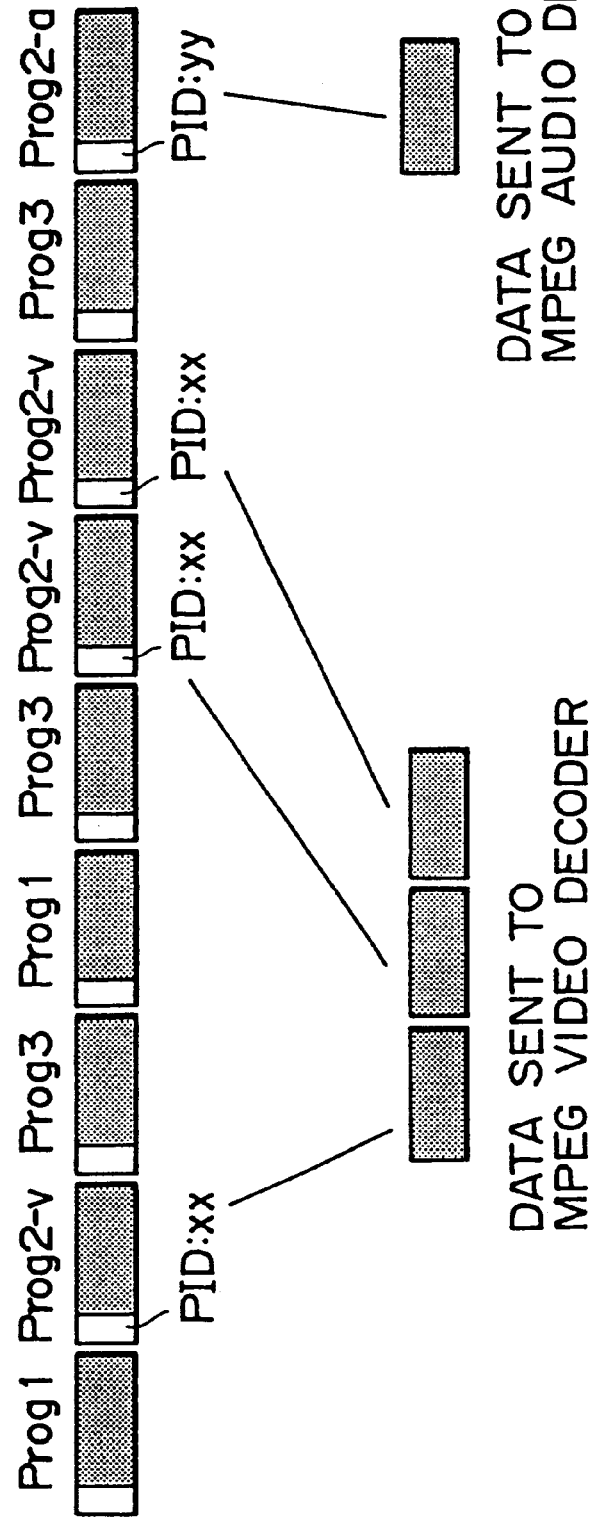
FIG. 2 is a diagram showing an example of a transport stream corresponding to one channel.

FIG. 2 shows an example of a transport stream corresponding to one channel. As shown in this figure, a plurality of programs (denoted herein by program nos. 1 to 3) are multiplexed in this transport stream. Herein, the term program refers to a hypothetical broadcast channel. In the context of current broadcasting in Japan, this corresponds for example to services such as NHK satellite channels 1 and 2.

The data for each program is grouped in packets of a predetermined length (188 bytes) which each have a header at their beginning. PID (Packet Identification) data is assigned to the header to identify the data.

Packets containing supplementary data from the transport stream corresponding to the desired channel selected by the front end 1 are provisionally written in the buffer memory 3 via the demultiplexer 2. Subsequently, MPEG video data and MPEG audio data in a desired program are identified and separated, the video data being sent to the MPEG video decoder 4, and the audio data being sent to the MPEG audio decoder 5. In FIG. 2, video data and audio data in a program 2 are separated.

When this separation is performed, the PID (packet ID) assigned to the packets is examined, and when the PID identifies video data and audio data in a desired program, the data are sent respectively to the MPEG video decoder 4 and MPEG audio decoder 5. In FIG. 2, the PID assigned to video data for program no. 2 is "xx", and the PID assigned to audio data for program no. 2 is "yy". The method employed in this digital signal processor for establishing the correspondence relation between program nos. and PID will be described hereafter.

The video data sent to the MPEG video decoder 4 is stored in the buffer memory 4a, and is read and decoded when convenient. Decoded video data is converted to the NTSC signal system by the NTSC converter 6, and after conversion to analog video data by the D/A converter 7, it is supplied to an external monitor, not shown. Audio data sent to the MPEG audio decoder 5 is stored in the buffer memory 5a, and is read and decoded when convenient. After decoded audio data is converted to analog audio data by the D/A converter 8, it is supplied to the speaker of the monitor, not shown.

In this way, digital broadcast video signals and audio signals are received, decoded and displayed on a monitor.

Next, the supplementary data will be described. As mentioned heretofore, PSI (Program Specific Information), EPG (Electronic Program Guide) or SI (Service Information) is added to the multiplexed bit stream. PSI which is specified by MPEG, and SI which is specified by DVB (Digital Video Broadcasting) used in Europe, will now be described.

(1) PAT (Program Association Table)

This table is specified by MPEG. The PID (packet ID) is 0. The main contents of the table are PID of NIT and PID of PMT described hereafter.

(2) PMT (Program Map Table)

This table is specified by MPEG. The PID is determined by the PAT mentioned above. The table gives the correspondence between program numbers and PID, and the PID of ECM (scrambled data appended to programs).

(3) CAT (Conditional Access Table)

This table is specified by MPEG. The PID is 1. The main contents of the table are EMM (scrambled information for customers).

(4) NIT (Network Information Table)

The PID is 0010. The main contents of the table are network names (satellite names, ground wave transmitters, etc.), and modulating schemes or frequencies related to transport streams (physical channels).

The following tables are specified by DVB.

(5) BAT (Bouquet Association Table)

The PID is 0011. The main contents of the table are names of bouquets (program providers) and destination countries, service details of transport streams (physical channels) and CASS (Conditional Access Service System) methods.

(6) SDT (Service Description Table)

The PID is 0011. The main contents are related to transport streams (physical channels), and service ID's contained therein, and the names of bouquets. Herein, the service ID's are broadcasting channels such as NHK satellite 1 and NHK satellite 2. This is therefore the same as the program nos. specified by MPEG.

(7) EIT (Event Information Table)

The PID is 0012. The main contents are event ID's, their starting time, broadcasting time and program details. Transport stream ID's and service ID's are given for each event ID. An event refers to, for example, "News at 7 a.m. (December 1)".

(8) Time and Date Table

The PID is 0010. The main content is information about world standard time. The processor's internal clock, not shown, is set using this TDT.

(9) RST (Running Status Table)

The PID is 0013. The main content is information about performing events, i.e. information before an event starts, during its execution and after it has been completed.

Next, a description will be given of how the microcomputer 9 in this digital signal processor, processes PSI and SI mentioned above.

First, in the digital signal processor, constants and other parameters are set combining the various network systems. This information is written to the network information table which therefore gives modulation schemes, frequencies, bit rates and error correction methods for transport streams. After setting, this data is stored in an EEPROM, not shown, of the microcomputer 9.

Next, events are searched from the EIT. In the EIT, a unique event ID is assigned to each broadcasting event, program names and contents are written together with their start times, and transport stream ID's and service ID's are written for each event. The transport stream ID is identified from the EIT, the digital signal processor is set using transport stream constants obtained from the NIT, and the transport stream corresponding to the desired channel is thereby selected.

The above is the processing performed when a transport stream for a desired channel is selected in the front end 1. Next, the processing performed by the microcomputer 9 when the output of the demultiplexer 2 is sent to the MPEG video decoder 4 and MPEG audio decoder 5, will be described.

Figure 3:
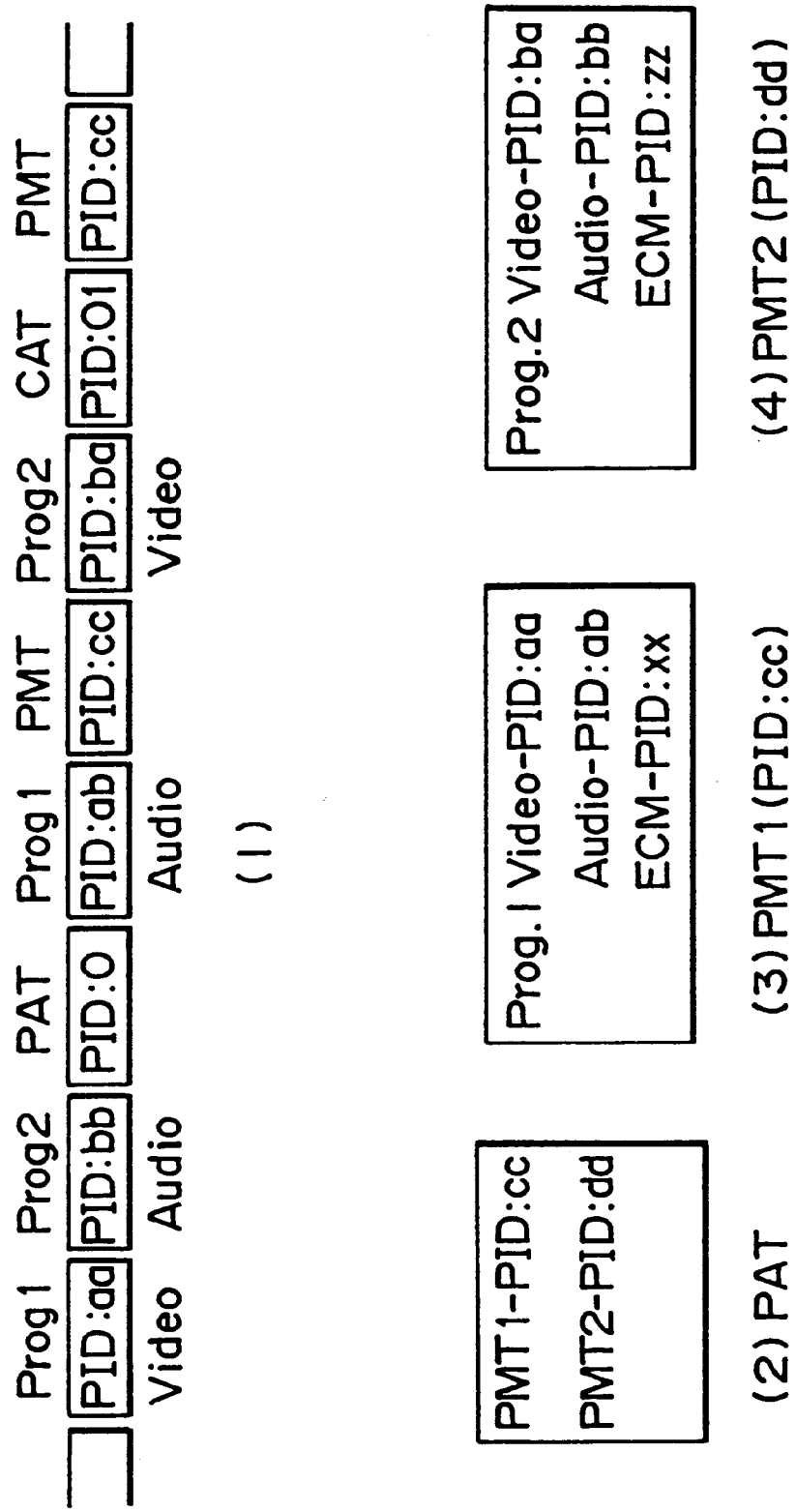
FIG. 3 is a diagram showing an example of a transport stream input to a demultiplexer, and the contents of a PAT and PMT in the transport stream.
Figure 4:
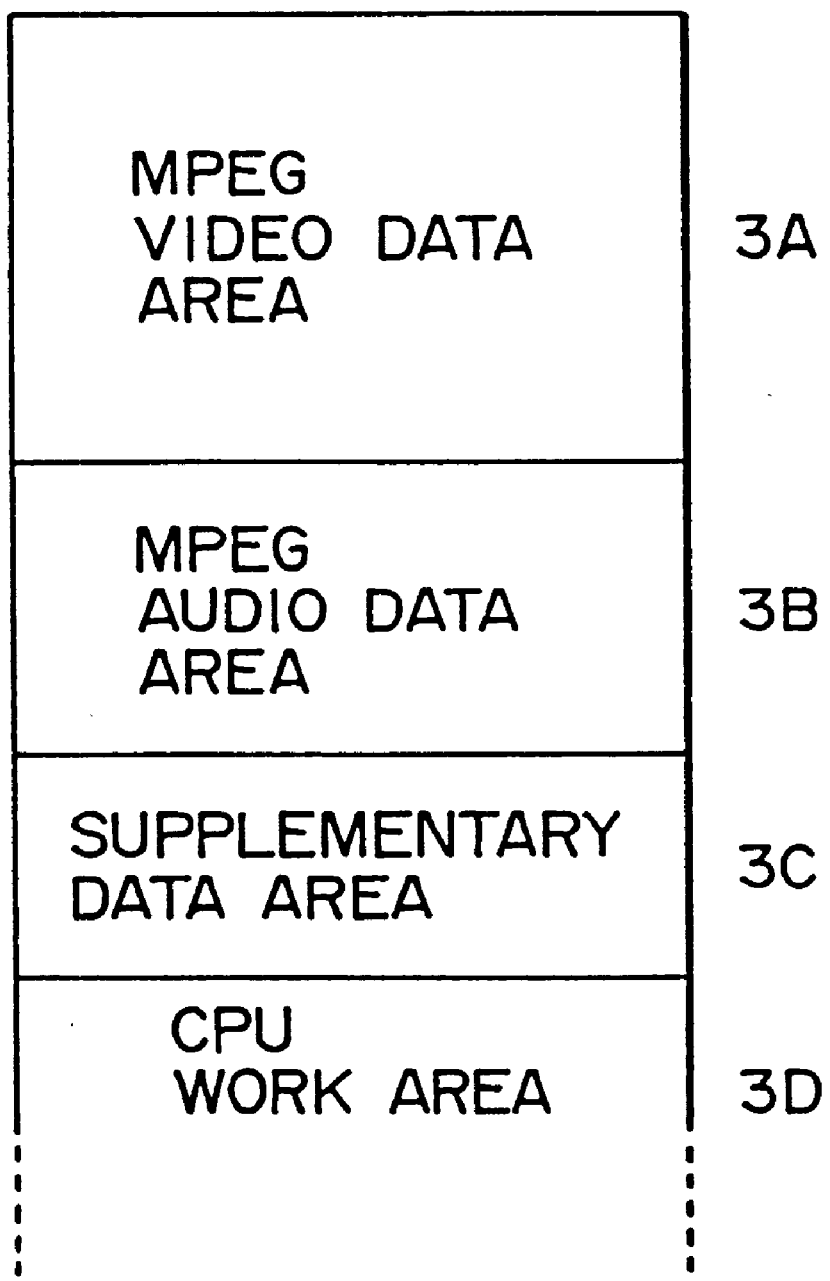
FIG. 4 is a diagram showing an example of the internal construction of a buffer memory 3 in FIG. 1.
Figure 5:
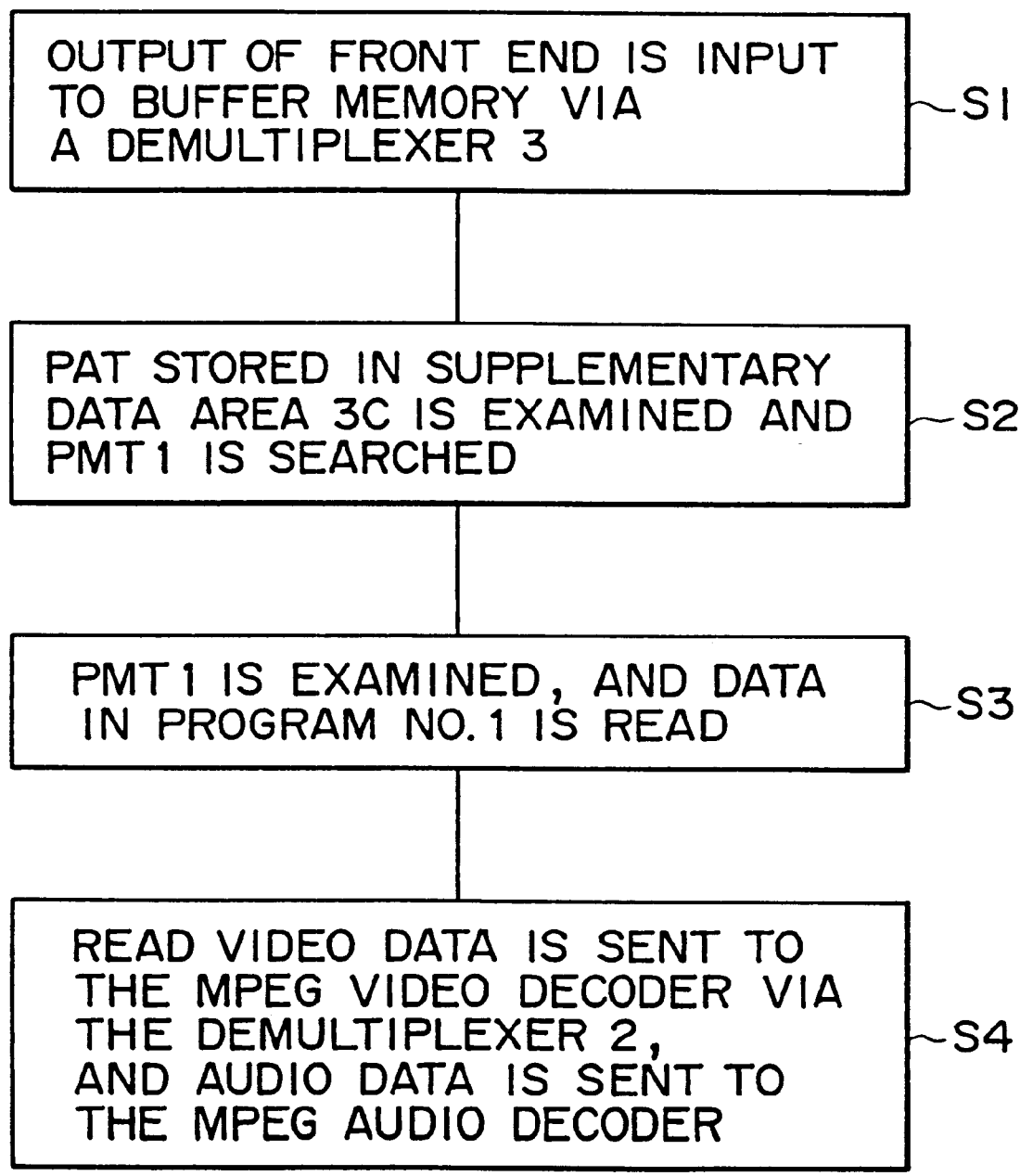
FIG. 5 is a diagram showing the processing flow in a microcomputer when the output of the demultiplexer is sent to a MPEG video decoder and MPEG audio decoder.

FIG. 3 shows an example of a transport stream input to the demultiplexer 2, and the content of the PAT and PMT in the transport stream. FIG. 4 shows the internal construction of the buffer memory 3. FIG. 5 shows the flow of this processing. The following description refers to the case where program no. 1 is selected.

First, in a step S1 of FIG. 5, the output of the front end 1 is written to the buffer memory 3 via the demultiplexer 2. In the buffer memory 3, storage areas 3A–3C are defined for each data as shown in FIG. 4, and the different types of data are written to these areas.

Next, in a step S2, the PAT is searched from the supplementary data written to the supplementary data area 3C of the buffer memory 3. To perform this processing, the packet with a PID of 0 may be searched. A PID of the PMT for each program (herein, the PID for PMT1 is "cc" and the PID for PMT2 is "dd") is written in the PAT as shown in FIG. 3(2).

Next, the packet with a PID of "cc" is searched. In this way, PMT1 corresponding to program no. 1 is detected. MPEG video data, MPEG audio data and the PID of ECM for program no. 1 are written in PMT1, as shown in FIG. 3(3).

Therefore, to view the program no. 1, the packet having a PID of "aa" is read from the MPEG video data area 3A of the buffer memory 3 and sent to the MPEG video decoder 4 via the demultiplexer 2, and the packet having a PID of "ab" is read from the MPEG audio data area 3B and sent to the MPEG audio decoder 5 via the demultiplexer 2. Data without headers is transmitted in this process as shown in FIG. 2. Scrambling is also decoded using ECM information written in the packet with a PID of "xx".

To view the program no. 2, the packet having a PID of "dd" is searched in the same way. In this packet, video data, audio data and the PID of ECM are written as shown in FIG. 3(4). The packet with a PID of "ba" is read from the MPEG video data area 3A of the buffer memory 3 and sent to the MPEG video decoder 4, and the packet with a PID of "bb" is read from the MPEG audio data area 3B and sent to the MPEG audio decoder 5. Scrambling is also decoded using ECM information written in the packet having a PID of "zz".

The above description refers to the usual processing performed when a transport stream input from the front end 1 is decoded. The digital signal processor of FIG. 1 can also output the MPEG video data, MPEG audio data and supplementary data separated by the demultiplexer 2, to a recording/playback device such as a DVCR via the digital interface 11. In addition, the processor can receive MPEG video data MPEG audio data and supplementary data output by an external recording/playback device via the digital interface 11, and send it to the demultiplexer 2. This processing will now be described.

First, the processing of the microcomputer 9 will be described where the output of the demultiplexer 2 is transmitted to external devices from the digital interface 11. As most of this processing is the same as that of the ordinary processing described above, only the points which differ will be mentioned here.

The MPEG video data and MPEG audio data are transmitted to the digital interface 11 together with packet headers. In other words, when the microcomputer 9 reads from the buffer memory 3, it reads data out for each header, and sends it to the digital interface 11 via the demultiplexer 2.

PSI and SI are also sent to the digital interface 11 with headers. However, PAT leaves only the PID specified by the PMT having the selected program no., and eliminates the remainder. For example, when program no. 1 is selected, only the PID for PMT1 ("cc" in the case of FIG. 3) is left and the remainder are eliminated.

The data sent to the digital interface 11 is transmitted to external devices. The digital interface is based on for example IEEE-1394, in which case the data is inserted into asynchronous packets according to IEEE-1394 before it is output. The asynchronous packets output by the digital interface 11 are sent to an external DVCR or the like. The data is then extracted from the asynchronous packets, error correction coding is added in the recording system and, after the data is subjected to channel coding, it is recorded.

Next, the case will be described when data recorded on a DVCR is played back and input to the digital signal processor in the above manner. The external DVCR inputs playback data to an asynchronous packet which is output. This asynchronous packet is input to the digital interface 11, the original MPEG video data, MPEG audio data and supplementary data are extracted, and these are written to the buffer memory via the demultiplexer 2.

The processing of MPEG video data and MPEG audio data written to the buffer memory 3 is the same as the processing of the data in the transport stream input from the front end 1 described above. On the other hand, the microcomputer 9 processes PSI and SI written in the buffer memory 3 as described below.

PAT and PMT are used without modification. As described above, when data is output from the digital signal processor to an external DVCR, only the PID specifying a PMT corresponding to a program no. selected from the PAT is left and the remaining data are eliminated, hence only the PID specifying the PMT for a program no. currently being input is written on the PAT in the data input from the external DVCR. The MPEG video data and MPEG audio data for the program currently being input can therefore be read by examining the PAT to search the PMT. The read MPEG video data and MPEG audio data are sent to the MPEG video decoder 4 and MPEG audio decoder 5 via the demultiplexer 2, and are then processed in the same way as from the front end 1.

As regards the EIT, only actual or present data in the program written in the PAT are decoded, the remainder being ignored. Herein, the term actual refers to the transport stream in the selected channel, and present refers to the fact that the selected program is being broadcast.

As regards RST, only elements related to programs written in the PAT are decoded, the remainder being ignored. Concerning SDT, only actual elements in programs written in the PAT are decoded, the remainder being ignored.

NIT is required for setting in the front end 1, however as it is unnecessary in the demultiplexer 2, it is ignored. BAT is also ignored.

Regarding TDT, when a playback signal from an external recording/playback device is input, the TDT in the playback signal from the device indicates the time when video recording was performed and not the current time, hence this TDT is ignored. When the input signal from the external device is not a playback signal, and the TDT indicates the present time, the TDT is decoded. In other words, the processing is different according to whether or not the TDT indicates the present time. It is therefore convenient if data indicating whether or not the TDT does indicate the present time, is added to the input signal from the external device. This avoids setting an incorrect time when the internal clock is reset.

The case will now be described when a plurality of programs are continuously input from an external DVCR. The microcomputer 9 examines the PAT to search the PMT, and reads MPEG video data and audio data in the program currently being input from the external DVCR by examining the PMT. However, when the external DVCR continuously outputs a plurality of programs and the program is changed over, the microcomputer 9 examines the PAT to search for the PMT, and the MPEG video data and MPEG audio data for the program that was changed cannot be read. Also as past data is used for decoding in the MPEG video decoder 4 and MPEG audio decoder 5, correct decoding cannot be performed unless the program data prior to change-over which remains in the buffer memories 4a and 5a is cleared.

Likewise regarding SI, when a change-over is made to a program with a different transport stream, SI in the buffer memory 3 must also be updated.

Figure 6:
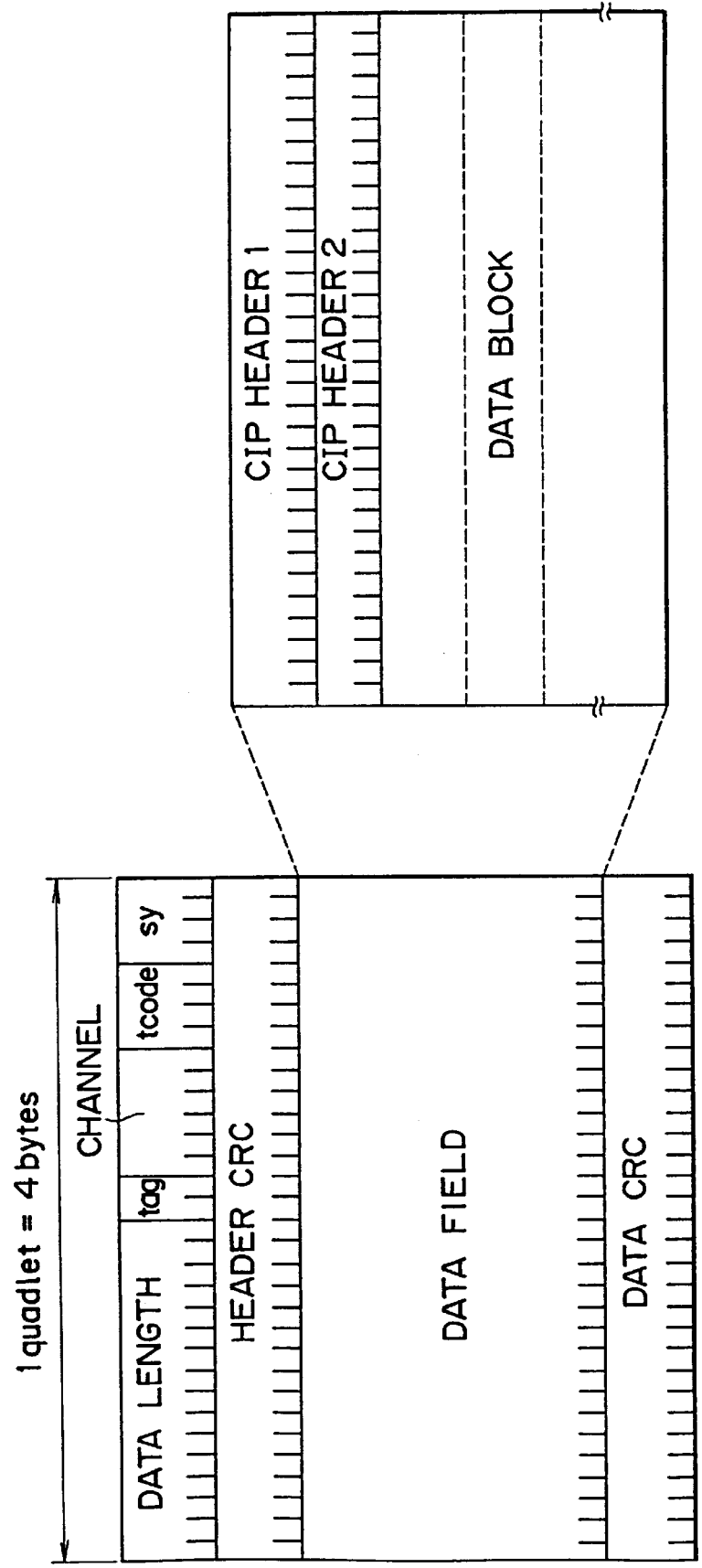
FIG. 6 is a diagram showing the format of an asynchronous packet.

According to this embodiment, therefore, when the program played back by the DVCR changes, a flag identifying this is appended to the header of the asynchronous packet. FIG. 6 is a diagram showing the format of an asynchronous packet. When the 2 bits of a tag field are $01_2$, a 2 quadlet common asynchronous packet header (referred to hereafter as CIP header) is inserted at the start of the data field. The value of tag is set to $01_2$ to handle real time video and audio signal data from digital video instruments or digital audio instruments.

Figures 7, 8:
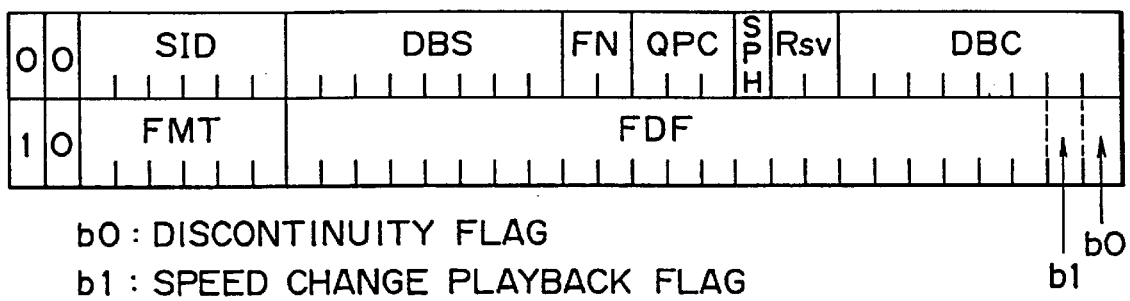
FIG. 7 is a diagram showing a CIP header when a tag takes the value $01_2$.
FIG. 8 is a diagram showing an example of assigning a FMT (format type) in a CIP header.

FIG. 7 shows a CIP header when tag=$01_2$. FIG. 8 shows an example of assigning FMT (format type) in the CIP header. As shown in FIG. 6, DVCR is specified by FMT=$000000_2$ and the MPEG signal transfer format is specified by $100001_2$. According to this embodiment, a discontinuity flag is assigned to the bit b0 of a FDF (Format Dependent Field).

When the transport stream in the DCVR playback signal becomes discontinuous, this discontinuity flag is set to a "H (high)" level for a predetermined time (e.g. 1 second). Specifically, video auxiliary data (VAUX data) indicating the start position (REC START) and end position (REC END) of recording are recorded together with video data when video data are recorded in the DVCR. Consequently, the discontinuity flag is set to the "H (high)" level when this auxiliary data is detected during playback.

According to this embodiment, the aforesaid discontinuity flag is set to the "H (high)" level when the DVCR mode changes from stop (STOP) to playback (PB). Hence, even when a program is played back from the middle, the data in the buffer memories 4a, 5a can be cleared and SI in the buffer memory 3 can be updated.

Further, according to this embodiment, a speed change playback flag is appended to the bit b1 of FDF. This flag is set to the "H (high)" level when the DVCR operating mode is slow or cue/review. During this speed change playback, only MPEG I pictures are valid data, so the buffer memory 4a underflows, and the output of the MPEG video decoder 4 is cut off until the next I picture is decoded. The construction of the digital signal processor is therefore such that when this flag is detracted, the I picture which was last decoded is output from the MPEG video decoder 4 until the next I picture is input.

FIG. 9 is a flowchart showing the processing performed by the microcomputer 9 when there is an external input.

First, the microcomputer 9 determines whether or not there is an external input (step S11). The determination of whether or not there is an external input is made from the output of the front panel 10.

Next, it is determined whether or not a discontinuity flag was detected (step S12). This determination is based on whether or not the digital interface 11 detected the discontinuity flag shown in FIG. 7. When a discontinuity flag is detected, the PAT, PMT and SI in the buffer memory 3 are updated, and a command to clear the data in the buffer memories 4a, 5a is issued to the MPEG video decoder 4 and MPEG audio decoder 5 (step S13).

Next, it is determined whether or not a speed change playback flag was detected (step S14). This determination, like that of the step S12, is based on whether or not the digital interface 11 detected the speed change playback flag shown in FIG. 7. When the speed change playback flag is detected, a command is issued to the MPEG decoder 4 to continue outputting the I picture which was last decoded.

FIG. 6 is a diagram showing the format of an asynchronous packet. When the 2 bits of a tag field are $01_2$, a 2 quadlet common asynchronous packet header (referred to hereafter as CIP header) is inserted at the start of the data field. The value of tag is set to $01_2$ to handle real time video and audio signal data from digital video instruments or digital audio instruments. FIG. 7 shows a CIP header when tag=$01_2$. FIG. 8 shows an example of assigning FMT (format type) in the CIP header.

According to this embodiment, FMT=$100001_2$ and the format of the MPEG signal transfer is specified. MPEG data is input to data blocks after the CIP header shown in FIG. 6.

Figure 10A:
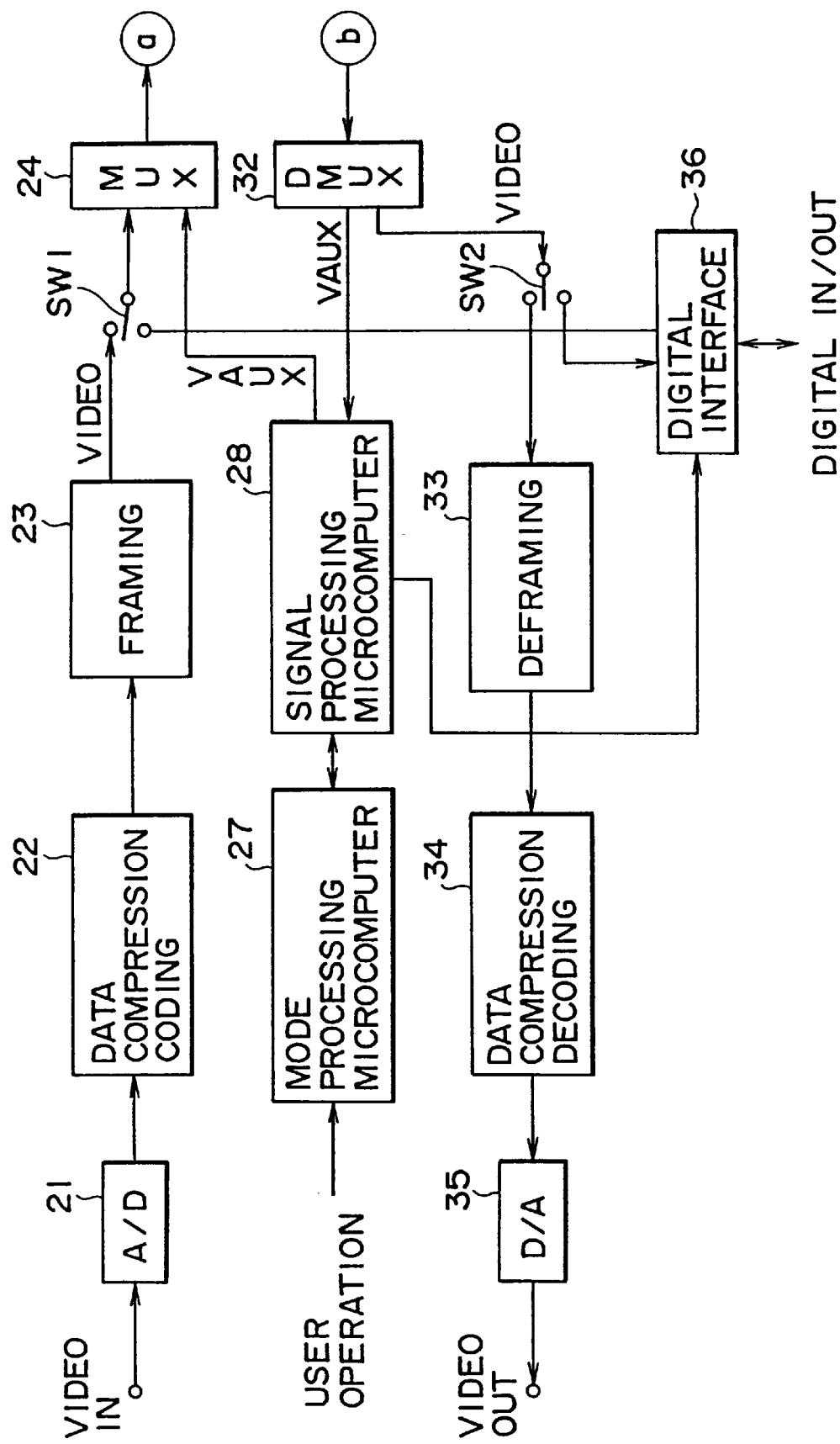

FIG. 10 is a block diagram showing the construction of a DVCR to which this invention is applied. This DVCR has a function for coding, and recording/playing back, analog video signals, and a function for recording/playing back MPEG digital signals.

First, recording/playback of analog video signals will be described.

To record analog video signals, this DVCR comprises an A/D converter 21 which digitizes video signals, a data compression coding circuit 22 which performs data compression such as DCT (Discrete Cosine Transformation), quantization and variable length coding on the output of the A/D converter 21, and a framing circuit 23 which frames the output of the data compression coding circuit 22.

Further, this DVCR comprises a multiplexer 24 which combines the output of the framing circuit 23 and video auxiliary data (VAUX data) generated by a signal processing microcomputer 28 described hereafter, an error correction code adding circuit 27 which adds an error correction code to the output of the multiplexer 24, and a channel encoder 26 which records/modulates the output of the error correction coding circuit 27.

This DVCR further comprises a mode processing microcomputer 27 which generates video signal TV channels and data signals such as recording date and time, etc., based on user operations, and a signal processing microcomputer 28 which generates VAUX data, etc., based on the output of the mode processing microcomputer 27. Herein, VAUX data comprises TV channels, recording date and time, recording start (REC START) position and recording end (REC END) position on a video tape.

FIG. 11 shows the format of one track of data output by the error correction code adding circuit 25. As shown in the figure, the video data and VAUX data is organized in block units of 90 bytes. This data undergoes recording/modulation in the channel encoder 26, is amplified by a recording amplifier, not shown, and is recorded on a video tape by a magnetic head, not shown. In an actual DVCR, video data, VAUX data, audio data and subcode data are time-divided on the track when they are recorded.

The above is a description of the coding and recording of analog video input signals. Next, the reproduction of recorded video signals will be described.

This DVCR comprises a playback circuit 29 which performs waveform equalization of data amplified by the playback amplifier, not shown, and playback of a data clock, a channel decoder 30 which performs recording demodulation on data output by the playback circuit 29, an error correction circuit 30 which performs error correction on the output of the channel decoder 10, a demultiplexer 22 which separates video data and VAUX data from the error correction circuit 31, a deframing circuit 23 which separates the frames of this video data, a data compression decoding circuit 24 which performs processing such as decoding of variable length codes, reverse quantization and reverse DCT on the output of the deframing circuit 23, and a D/A converter 35 which converts the output of the data compression decoding circuit 24 to an analog format and converts it to an analog video signal. The VAUX data separated by the demultiplexer 32 is sent to the signal processor microcomputer 28, and sent from here to the mode processor microcomputer 27.

Next, recording/playback of a coded signal input from an external device, will be described. This DVCR has a digital interface 36. This digital interface 36 has the same construction as the digital interface 11 in the receiver/demodulator of FIG. 1. IEEE-1394 packets are sent to and received from the digital interface 11 of FIG. 1.

Next, the recording of MPEG data input from the digital interface 36 will be described. This MPEG data is input in asynchronous packets from the digital interface 11 of the receiver/demodulator of FIG. 1, and transferred.

First, MPEG data from the asynchronous packets in the digital interface 36, i.e. MPEG video data, MPEG audio data and supplementary data are separated. The separated data is sent to the multiplexer 24 via a switch SW1, multiplexed with VAUX data output by the signal processor microcomputer 28, and is converted to the format of FIG. 11 by the error correction code adding circuit 25. In other words, MPEG video data, MPEG audio data and supplementary data are all recorded on the video data recording area. The processing after the error correction code adding circuit 25 is the same as for the aforesaid recording of analog video signals.

Next, the processing during playback of MPEG data will be described. Up to input of playback data to the demultiplexer 32, processing during playback is the same as processing during playback of video signals. The playback data input to the demultiplexer 32 is separated at this state into MPEG data and VAUX data. MPEG data is sent to the digital interface 36 via the switch SW2. VAUX data is sent to the signal processing microcomputer 28.

In the digital interface 36, headers shown in FIG. 6 and FIG. 7 are added to the MPEG data, and output to external devices as an asynchronous packet. This asynchronous packet is input to the digital interface 11 of the receiver/demodulator, the original MPEG video data, MPEG audio data and supplementary data are extracted, and written to the buffer memory 3 via the demultiplexer 2.

The flags described above are shown in FIG. 12. Herein, NP is normal play data, and TP is triple play data. NP1–NP2 indicates that a normal play program has changed.

What is claimed:

1. A digital signal processing device comprising:
   a receiver for receiving digital video and audio signals for a plurality of program and supplementary information;
   a demultiplexer for demultiplexing digital video and audio signal for a desired program selected from said plurality of programs; and
   a digital interface for transmitting said demultiplexed digital video and audio signals to an external device;

wherein said digital interface eliminates supplementary information which does not relate to said desired program and transmits remaining supplementary information to said external device.

2. A digital signal processing device comprising:

a detector for receiving a transport stream which includes video packets, audio packets and supplementary information packets and detecting discontinuity of said received transport stream; and a digital interface for generating discontinuity information in response to the detection of discontinuity by said detector and transmitting said received transport stream and said generated discontinuity information to an external device.

3. A digital signal processing device comprising:

a memory for receiving and storing a supplementary information which is included in a received transport stream; and a controller for detecting discontinuity of said received transport stream;

wherein said controller updates the contents of said memory in response to the detection of discontinuity.

4. A digital signal processor comprising:

a digital interface connected to an external device for receiving video data, audio data and supplementary data from said external device;

a controller for detecting a program discontinuity data contained in said supplementary data received from said external device; and a demultiplexer for receiving said video data, audio data and supplementary data from said digital interface;

wherein said supplementary data in said demultiplexer is updated in response to detection of said program discontinuity data by said controller.

5. A digital signal processor comprising:

a digital interface connected to an external device;

a detector for detecting a change of programs to be transmitted to said external device through said digital interface; and a generator for generating discontinuity data in accordance with said detector;

wherein said discontinuity data is transmitted to said external device through said digital interface.

6. A digital signal processor comprising:

a tuner for selecting a single transport stream containing a plurality of multiplexed channels for a plurality of transmitted transport stream;

a digital interface connected to an external device; and a demultiplexer for separating video data and audio data corresponding to one or more programs to be transmitted to said external device through said digital interface;

wherein said digital interface deletes unnecessary supplementary data which does not relate to said one or more programs to be transmitted; and wherein said separated video data, audio data and deleted supplementary data are transmitted to said external device through said digital interface.

7. The digital signal processing device according to claim 1, wherein said digital video and audio signals and supplementary information are transmitted in a plurality of transport packets.

8. The digital signal processing device according to claim 1, wherein said external device is a digital storage device.

9. The digital signal processing device according to claim 1, wherein said demultiplexer digital video and audio signals are transmitted in a plurality of isochronous packets.

10. The digital signal processing device according to claim 3, wherein said transport stream is transmitted from an external device.

11. The digital signal processing device according to claim 10, wherein said external device is a digital storage device.

12. The digital signal processing device according to claim 3, wherein said transport stream is transmitted in a plurality of isochronous packets.

13. The digital signal processing device according to claim 3, further comprising:

a demultiplexer for separating said received transport stream into video packets, audio packets and supplementary information packets;

wherein said memory is connected to said demultiplexer.

14. The digital signal processing device according to claim 4, wherein said external device is a digital storage device.

15. The digital signal processing device according to claim 4, wherein said video data, audio data and supplementary data are contained in a plurality of transport packets.

16. The digital signal processing device according to claim 4, wherein said video data, audio data and supplementary data are contained in a plurality of transport packets and the plurality of transport packets are contained in a plurality of isochronous packets for the transmission from said external device.

17. The digital signal processing device according to claim 5, wherein video data, audio data and supplementary data are transmitted from said external device through said digital interface.

18. The digital signal processing device according to claim 17, wherein said video data, audio data and supplementary data are contained in a plurality of transport packets.

19. The digital signal processing device according to claim 5, wherein said video data, audio data and supplementary data are contained in a plurality of transport packets and the plurality of transport packets are contained in a plurality of isochronous packets for the transmission from said external device.

20. The digital signal processing device according to claim 6, wherein said external device is a digital storage device.

21. The digital signal processing device according to claim 6, wherein said separated video data, audio data and deleted supplementary data are transmitted in a plurality of isochronous packets.

22. A digital signal processing method comprising the steps of:

receiving digital video and audio signals for a plurality of program and supplementary information;

demultiplexing digital video and audio signal for a desired program selected from said plurality of programs; and transmitting said demultiplexed digital video and audio signals to an external device;

wherein said supplementary information which does not relate to said desired program is eliminated and the remaining supplementary information is transmitted to said external device.

23. The digital signal processing method according to claim 22, wherein said digital video and audio signals and supplementary information are transmitted in a plurality of transport packets.

24. The digital signal processing method according to claim 22, wherein said external device is a digital storage device.

25. The digital signal processing method according to claim 22, wherein said demultiplexer digital video and audio signals are transmitted in a plurality of isochronous packets.

26. A digital signal processing method comprising the steps of:

receiving a transport stream which includes video packets, audio packets and supplementary information packets and detecting discontinuity of said received transport stream; and generating discontinuity information in response to the detection of discontinuity by said detector and transmitting said received transport stream and said generated discontinuity information to an external device.

27. A digital signal processing method comprising the steps of:

receiving and storing in a memory a supplementary information which is included in a received transport stream; and detecting discontinuity of said received transport stream;

wherein the contents of said memory are updated in response to the detection of discontinuity.

28. The digital signal processing method according to claim 27, wherein said transport stream is transmitted from an external device.

29. The digital signal processing method according to claim 28, wherein said external device is a digital storage device.

30. The digital signal processing method according to claim 27, wherein said transport stream is transmitted in a plurality of isochronous packets.

31. The digital signal processing method according to claim 27, further comprising the steps of:

separating said received transport stream into video packets, audio packets and supplementary information packets;

wherein said memory is connected to said demultiplexer.

32. A digital signal processing method comprising the steps of:

receiving video data, audio data and supplementary data from an external device; and detecting a program discontinuity data contained in said supplementary data received from said external device;

wherein said supplementary data is updated in response to detection of said program discontinuity data.

33. The digital signal processing method according to claim 32, wherein said external device is a digital storage device.

34. The digital signal processing method according to claim 32, wherein said video data, audio data and supplementary data are contained in a plurality of transport packets.

35. The digital signal processing device according to claim 32, wherein said video data, audio data and supplementary data are contained in a plurality of transport packets and the plurality of transport packets are contained in a plurality of isochronous for the transmission from said external device.

36. A digital signal processing method comprising the steps of:

detecting a change of programs to be transmitted to an external device through a digital interface; and generating discontinuity data in accordance with said detected change of programs;

wherein said discontinuity data is transmitted to said external device through said digital interface.

37. The digital signal processing method according to claim 36, wherein video data, audio data and supplementary data are transmitted from said external device through said digital interface.

38. The digital signal processing method according to claim 37, wherein said video data, audio data and supplementary data are contained in a plurality of transport packets.

39. The digital signal processing method according to claim 37, wherein said video data, audio data and supplementary data are contained in a plurality of transport packets and the plurality of transport packets are contained in a plurality of isochronous packets for the transmission from said external device.

40. A digital signal processing method comprising the steps of:

selecting a single transport stream containing a plurality of multiplexed channels from a plurality of transmitted transport streams; and separating video data and audio data corresponding to one or more programs to be transmitted to an external device through a digital interface;

wherein said digital interface deletes unnecessary supplementary data which does not relate to said one or more programs to be transmitted; and wherein said separated video data, audio data and deleted supplementary data are transmitted to said external device through said digital interface.

41. The digital signal processing method according to claim 40, wherein said separated video data, audio data and deleted supplementary data are transmitted in a plurality of isochronous packets.

42. The digital signal processing method according to claim 40, wherein said external device is a digital storage device.

* * * * *